(12) United States Patent
Ashton

(10) Patent No.: US 6,839,058 B1
(45) Date of Patent: Jan. 4, 2005

(54) DEPTH SORTING FOR USE IN 3-DIMENSIONAL COMPUTER SHADING AND TEXTURING SYSTEMS

(75) Inventor: Martin Ashton, London (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 0 days.

(21) Appl. No.: 09/831,387
(22) PCT Filed: Nov. 8, 1999
(86) PCT No.: PCT/GB99/03705
§ 371 (c)(1), (2), (4) Date: May 4, 2001
(87) PCT Pub. No.: WO00/28481
PCT Pub. Date: May 18, 2000

(30) Foreign Application Priority Data

Nov. 6, 1998 (GB) .............................. 9824409

(51) Int. Cl.[7] .............................. G06T 15/00
(52) U.S. Cl. ..................... 345/421; 345/422
(58) Field of Search ............... 345/419, 420, 345/421, 422, 423, 426

(56) References Cited

U.S. PATENT DOCUMENTS

| | | | | |
|---|---|---|---|---|
| 5,363,475 A | * | 11/1994 | Baker et al. ............... | 345/422 |
| 5,402,532 A | * | 3/1995 | Epstein et al. ............. | 345/422 |
| 6,184,891 B1 | * | 2/2001 | Blinn ........................ | 345/426 |
| 6,373,485 B2 | * | 4/2002 | Sowizral et al. ........... | 345/421 |

FOREIGN PATENT DOCUMENTS

| | | | |
|---|---|---|---|
| GB | 2 281 682 | * | 3/1995 |
| WO | 95/30969 | * | 11/1995 |

OTHER PUBLICATIONS

Shade et al., "Layered Depth Images", ACM SIGGRAPH, Jul., 1998.*
Sutherland et al., "A Characterization of Ten Hidden–Surface Algorithms", Computing Surveys, vol. 6, No. 1, Mar. 1974.*
Schneider, et al., "M–Buffer: A Flexible MID Architecture For Advanced Graphics", *Computers and Graphics*, Great Britain, Pergamon Press, vol. 19, No. 2, pp. 239–246, Mar. 1, 1995.*
Mammen, "Transparency and Antialiasing Algorithms Implemented with the Virtual Pixel Maps Technique," *IEEE Computer Graphics and Applications*, vol. 9, No. 4, Jul. 1989.*

* cited by examiner

*Primary Examiner*—Almis R. Jankus
(74) *Attorney, Agent, or Firm*—Flynn, Thiel, Boutell & Tanis, P.C.

(57) ABSTRACT

A method and apparatus for automatically sorting translucent object data in a 3-dimensional computer shading texturing system first stores a list of objects to be shaded and textured. For each pixel, for each object in turn, it is determined whether an object in the list is further from an image plane than a current deepest object for that pixel. Data is stored for at least the deepest object in the list. The pixel is then shaded and textured for this object and the stored object is then discarded from the list. This is repeated until pixels have been shaded for all objects in the list.

15 Claims, 2 Drawing Sheets

DEPTH SORTING FOR USE IN 3-DIMENSIONAL COMPUTER SHADING AND TEXTURING SYSTEMS

This invention relates to sorting of objects for use in 3-dimensional computer imaging systems.

In current 3-dimensional shading and texturing systems, commonly known as z buffer systems, in order for the image to look correct, the application software using the z buffer has to pre-sort translucent objects in back to front order before they can be rendered. A method has been proposed by Mammen, A., "Transparency and Antialiasing Algorithms Implemented with the Virtual Pixel Maps Technique", CG & A, 9(4), July 1989, 43–55, which describes a system that removes this restriction and which can be used for z buffer systems. However, it has a significant drawback in that it requires a buffer the same size as the image size and which contains for each pixel a z or depth value, an RGB value and a translucent or alpha value. This doubles the storage requirements for a traditional z buffer system. In addition, the method proposed is based on the idea of rendering a single triangle from the image at a time, thus making the sorting performance very low.

In our British Patent No. 2298111 there is described a system in which the image is dissected into a number of smaller regions or tiles, generally rectangular in shape. We have appreciated that using this tile based system, the performance of automatic sorting of translucent objects can be vastly improved over the prior art systems. The storage requirements for a tile based system are significantly better than in the prior art as a result of using the tiling approach.

In 3-D shading systems of the type described in our British Patent No. 2298111, as well as in other systems, translucent objects have to be pre-sorted in back to front order by the application software before they can be rendered. This slows down the application software and reduces the full performance of the overall system. An additional problem arises in that the sorting of translucent objects has to be pixel accurate. This complicates the sorting when two objects intersect as shown in FIG. 1, then the intersection of the two objects has to be calculated, the objects then have to be split and the remaining parts are then sorted back to front.

The system explained here can inherently process a number of objects, usually triangles, at the same time and thereby achieve higher performance. Also, unlike the previous methods, the method described here uses a discard technique to reduce the complexity of the sorting and to increase its speed.

In accordance with the preferred embodiment of the invention, when sorting objects prior to rendering, a separate display list is maintained for translucent objects and one or more extra tile depth buffer is provided for sorting depths. This then allows the application software to send translucent objects to the rendering hardware in any order. The rendering hardware can then sort the translucent objects on a pixel-by-pixel basis in back to front order.

The invention will now be described in detail by way of example with reference to the accompanying drawings in which.

Figure 2:
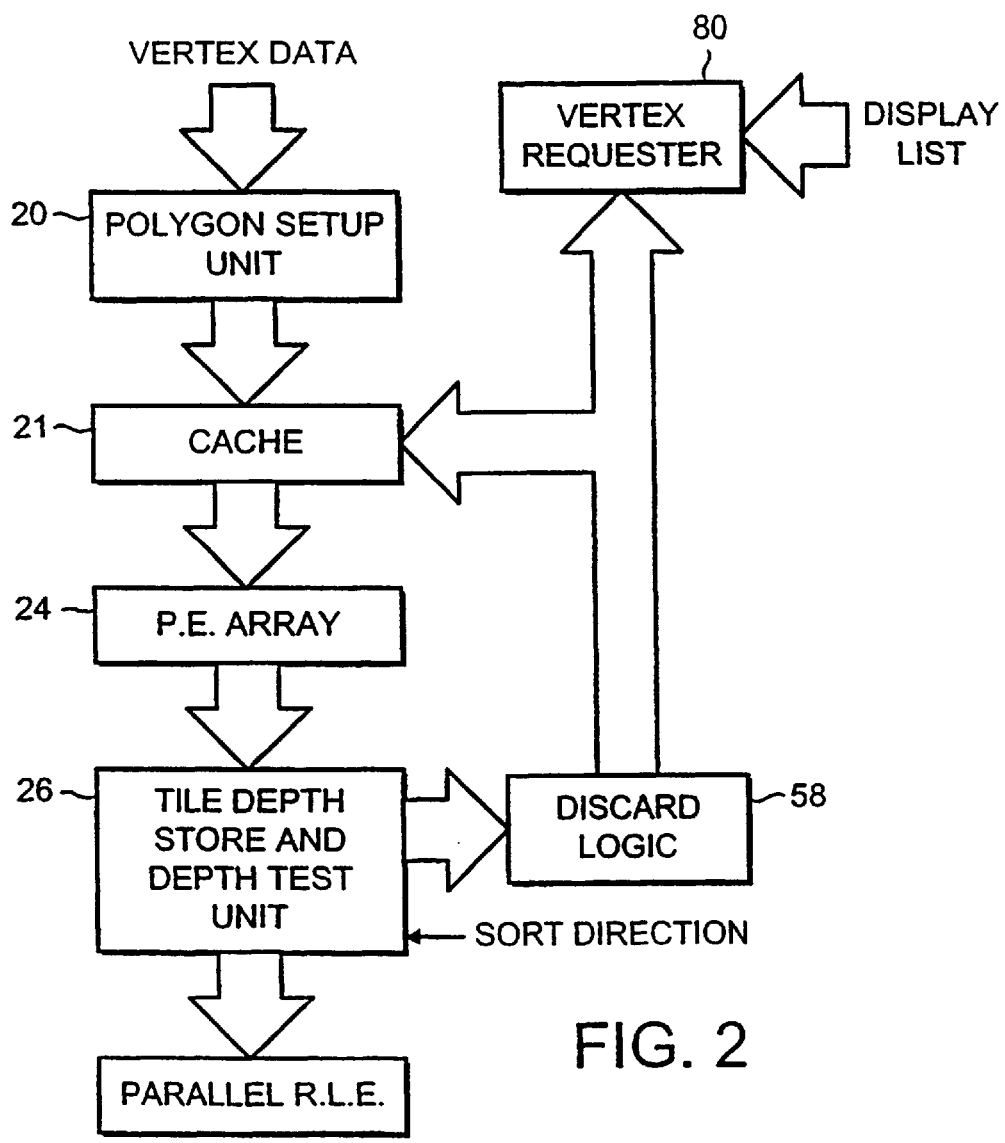
FIG. 2 is a block diagram of the auto-sort logic in a rendering system.

The diagram of FIG. 2 comprises a polygon set-up unit 20 which receives vertex data and from this generates the plane equations of the polygons, i.e., the equations which define the surfaces from which the polygons are made up. These are passed to a cache memory 21 which acts as a buffer between the polygon, setup unit and the processor array and can be controlled by the discard logic 58 to provide data about specific polygons to a processor element array 24. The processor array performs a series of ray surface intersection tests for rays passing from a viewpoint through an image plane into the scene to be rendered. Each surface is tested for each pixel and the results sent to the tile depth store and depth test unit 26. This tile depth store contains a storage unit and a depth test logic for each pixel in the tile and also contains auto sort logic.

The depth test logic performs a magnitude comparison between what is currently stored in the depth buffer and the depth of the current object being processed for each pixel. The application software can supply a compare mode which may be one of: "never", "less", "equal", "less or equal", "greater", "not equal", "greater or equal", or "always" in dependence on the type of comparison required.

The depth store and depth test unit 24 can supply the results of the depth test to discard logic 58. This stores a list of future surfaces required and requests them in the correct order from vertex requester 60. This has a sort direction input set by the user to be front to back or back to front. Once the sorted list of surfaces has been computed, the auto-sort logic is used to control a vertex requester 60 which sends requests to memory to supply vertex data to the polygon setup unit 20 from where they can be supplied again to the cache 21 and the processor element array 24. Thus, once the sorting has been performed, the appropriate attributes for each surface can be derived from the tile depth store and the output sent to a parallel run-length encoder which sends them to a rendering and texturing circuit (not illustrated here).

As can be seen, the vertex requester 50 also has access to a separate display list which forms an input to it. This is the display list of translucent objects referred to above. Prior to the auto-sort logic controlling the vertex requester, this is the source of object data for translucent objects in the image.

In operation, the system makes multiple passes through the translucent display list to sort the surfaces into the correct order. The number of passes depends on the total number of translucent layers. If there were ten translucent layers then it would take ten passes to fully sort the objects.

This arrangement can be significantly improved by having more than one depth buffer in the tile depth store 24. In the embodiment described here we have two additional depth buffers. This allows ten layers to be sorted in five passes and thus reduces the sort time by a factor of two. By adding further depth buffers, the system can be further improved. In a tile based system with a 32×32 pixel depth buffer, a further two 32×32 pixel depth buffers are preferably required to sort translucent objects. These depth buffers are called WorkingDepth 1 and WorkingDepth 2. The original depth buffer in tile depth store 24 is called the opaque depth buffer.

The following algorithm is used to sort all pixels in the tile. In the particular arrangement described here 32 pixels can be processed at once since 32 separate depth compare processors are provided.

Figure 1:
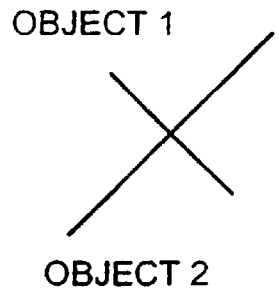
FIG. 1 is the object intersection referred to above.
Figure 3:
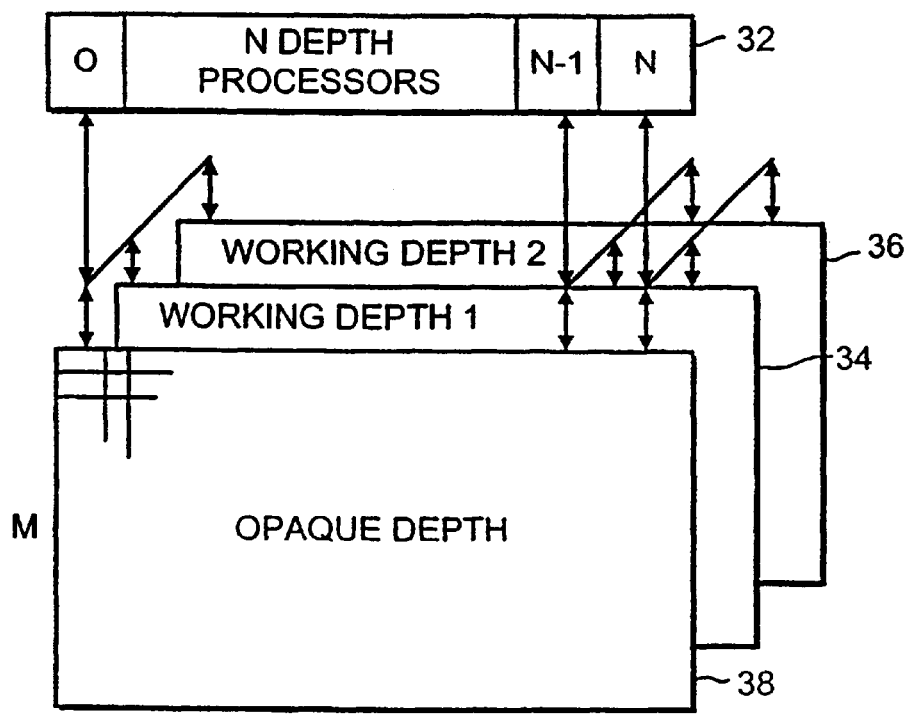
FIG. 3 is a more detailed diagram of the tile depth store and depth test unit.

The relationship between the depth processors and the working depth and opaque depth buffers is shown in FIG. 3. The depth processors 30 each comprise 32 processors, this being the width of each tile. The depth buffers are WorkingDepth 1 34, WorkingDepth 2 36, and the opaque depth buffer 38.

When sorting opaque objects the sorter is controlled to sort in a front to back order. On each pass, the closest object in the pass is stored in WorkingDepth 1. The object in WorkingDepth 1 is always closer than the object in WorkingDepth 2. Therefore, when the comparison of WorkingDepth 2 is that the object is closer than that in WorkingDepth 1 it replaces the object in WorkingDepth 1 (for that pixel) and the object originally in WorkingDepth 1 is discarded. The next object is then supplied to WorkingDepth 2 and comparison with WorkingDepth 1 is made again. Any opaque pixels in WorkingDepth 1 are supplied to the opaque depth buffer 38. If there is any closer opaque object arising from a subsequent pass then this replaces the depth in the opaque depth buffer for a particular pixel.

Translucent objects are processed after opaque objects. Multiple passes through the data are required to sort translucent objects on a back to front order. On each pass, the deepest and second deepest depths are stored and rendered. This continues until all objects have been fully rendered. Once a translucent object has been completely rendered it is discarded from the translucent display list. The next pass through the display list will then be faster and the sort time will be reduced.

The deepest object in the pass is stored in WorkingDepth 1 and the second deepest in WorkingDepth 2. The object in WorkingDepth 1 is always deeper than the object in WorkingDepth 2 and, therefore, when WorkingDepth 1 is replaced, the old object is moved into WorkingDepth 2 and the object originally in WorkingDepth 2 is discarded. If the object is not deeper than WorkingDepth 1 it is tested against the value in WorkingDepth 2. If deeper, it will replace it.

The pseudo code for this is now given.

```
depth_t WorkingDepth1;
depth_t WorkingDepth2;
int WorkingValid1;
int WorkingValid2;
depth_t BackDepth;
int DoAnotherPass;
int Discard;
/* Initialise this so that it will be copied into
BackDepth on the first pass. */
WorkingDepth2 = OpaqueDepth;
WorkingValid2 =1;
Do
{
  DoAnotherPass = 0;
  /* There might not be anything in W2, in which case
  use W1 instead. */
  if ( WorkingValid2 )
     BackDepth = WorkingDepth2;
  else if ( WorkingValid1 )
     BackDepth = WorkingDepth1;
  WorkingValid1 = 0;
  WorkingValid2 = 0;
  for ( each object )
  {
    Discard = 1;
    if ( depth closer than BackDepth )
    {
      Discard = 0;
      if ( depth deeper than WorkingDepth1) OR
      (WorkingValid1 ==0) }
      {
        if ( WorkingValid1 )
        {
          /* If there's already a depth in
          the store, shuffle it forwards
          into the W2 store. */
          WorkingDepth2 = WorkingDepth1;
          if ( WorkingValid2 )
             DoAnotherPass = 1;
          WorkingValid2 = 1;
        }
```

-continued

```
        /* Store the depth */
        WorkingDepth1 = depth;
        WorkingValid1 = 1;
      }
      else
      {
        /* If the object is *closer* than W1,
        test it against W2. */
        if ( ( depth deeper than WorkingDepth2) OR
        (WorkingValid2 ==
        0) )
        {
          /* Replacing an object in W2 will
          cause another pass. */
          if ( WorkingValid2 )
             DoAnotherPass = 1;
          WorkingDepth2 = depth;
          WorkingValid2 = 1;
        }
        else
        {
          /* An object closer than W2 will
          require another pass.
        */
          DoAnotherPass = 1;
        }
      }
    }
  }
}while DoAnotherPass;
```

After performing the above processing, another pass will be required if any of the following apply:

1. If an object is shuffled from WorkingDepth1 to WorkingDepth2, thereby displacing the object stored there previously;
2. If a write to the WorkingDepth2 store replaces an object stored earlier in the pass;
3. If an object was skipped because it was closer than the object in WorkingDepth2.

An object can be discarded from subsequent passes if it is behind that backdepth for all pixels in tile. The backdepth is the deepest visible depth in the scene.

The prior art algorithm referred to in the introduction had a sorting performance given by the equation:

$$Time=(Np) \times (Np)$$

where Np is the total number of translucent polygons in the image.

The method described here, if it has just one additional depth buffer, has a time given by the following equation:

$$Time < (Np) \times (N1)/2$$

where N1 is the total number of translucent layers. The number of layers is always less than or equal to the number of polygons. With two additional depth buffers as described above, the total time becomes:

$$Time < (Np) \times (N1)/4$$

by increasing the number of depth buffers further the sorting performance can be increased linearly.

What is claimed is:

1. A method for automatically sorting translucent object data in a three-dimensional computer shading and texturing system comprising the steps of:

a) storing a list of objects to be shaded and textured;
   b) determining at each pixel for each object in turn whether an object in the list is further from an image plane than a current deepest object;

c) storing data for at least the deepest object in the list;

d) shading and texturing the stored object;

e) discarding the stored object frm the list; and f) repeating steps b), c), d) and e) until all objects in the list have been shaded and textured.

2. A method according to claim 1 in which the image to be shaded and textured is firstly divided into a plurality of sub-regions, and the sorting is performed on individual sub-regions.

3. A method according to claim 2 in which the sorting is performed on each sub-region in turn.

4. The method according to claim 3 in which each sub-region comprises a plurality of pixels and a plurality of pixels are sorted in parallel.

5. The method according to claim 2, in which each sub-region comprises a plurality of pixels and a plurality of pixels are sorted in parallel.

6. The method according to claim 2, in which step c) also includes storing data for the second deepest object in the list, and step d) also includes shading, texturing and storing data for the second deepest object in the list.

7. The method according to claim 1, in which step c) also includes storing data for the second deepest object in the list, and step d) also includes shading, texturing and storing data for the second deepest object in the list.

8. The method according to claim 7, in which step c) includes storing data for the next deepest object in the list and step d) includes shading, texturing and storing data for the next deepest object in the list.

9. An apparatus for automatically sorting translucent object data in a three dimensional computer shading and texturing system comprising:

a) means for storing a list of objects to be shaded and textured;

b) means for determining at each pixel for each object in turn whether an object in the list is further from an image plane than a current deepest object;

c) means for storing data for at least the deepest object in the list;

d) means for shading or texturing the deepest object;

e) means for discarding the deepest object from the list.

10. The apparatus according to claim 7, in which the image to be shaded and textured is firstly divided into a plurality of sub-regions, and the sorting is performed in individual sub-regions.

11. The apparatus according to claim 10, in which each sub-region comprises a plurality of pixels and feature b) comprises a plurality of means for determining whether an object in the list is further from an image plane than a current deepest object, whereby a plurality of pixels may be processed in parallel.

12. The apparatus according to claim 10, including means for storing data for a next deepest object in the list and means for shading, texturing and storing data for the next deepest object in the list.

13. The apparatus-according to claim 9, in which the sorting is performed on each sub-region in turn.

14. The apparatus according to claim 13, in which each sub-region comprises a plurality of pixels and feature b) comprises a plurality of means for determining whether an object in the list is further from an image plane than a current deepest object, whereby a plurality of pixels may be processed in parallel.

15. The apparatus according to claim 9, including means for storing data for a next deepest object in the list and means for shading, texturing and storing data for the next deepest object in the list.

* * * * *